Dec. 14, 1965    G. MEYER    3,222,718
MOLD AND VALVE MEANS FOR FILLING SAME
Filed Nov. 29, 1962
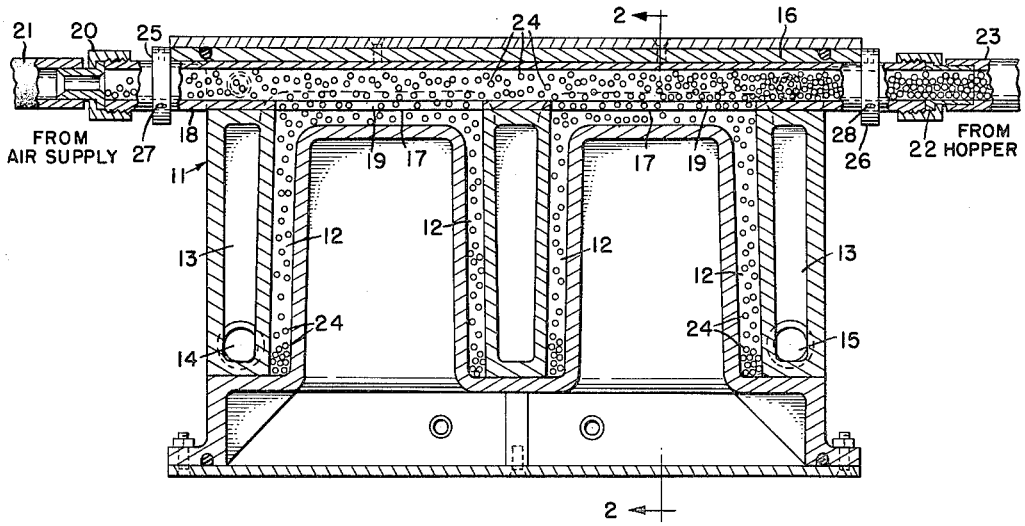
FIG. 1.
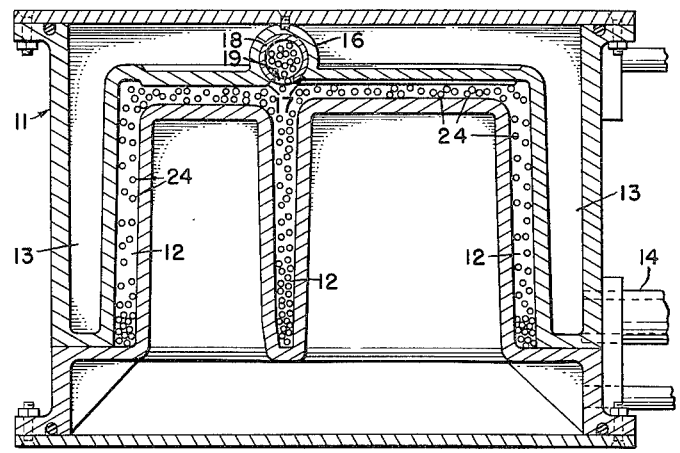
FIG. 2.
FIG. 3.
FIG. 4.
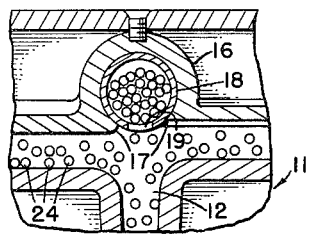
FIG. 5.
INVENTOR.
GERSON MEYER
BY Albert J. Kramer
ATTORNEY 3,222,718
MOLD AND VALVE MEANS FOR
FILLING SAME
Gerson Meyer, Baltimore, Md., assignor to Life-Like Products Inc., Baltimore, Md., a corporation of Maryland
Filed Nov. 29, 1962, Ser. No. 240,994
4 Claims. (Cl. 18—5)

This invention relates to molds and it is more particularly concerned with means of loading mold cavities with filling materials to be treated by the mold.

The invention is especially adapted to the molding of plastic materials and to methods of filling materials such as by the use of expandable beads of polystyrene and similar materials.

An object of the invention is the provision of means for loading mold cavities with molding materials quickly and efficiently.

Another object of the invention is the provision of means combined with a mold by which beads of a plastic moldable material may be fed to the mold cavities in such a way as to insure a complete and proper filling of the cavities and a removal of excess filling material after the cavities are filled.

These and still further objects, advantages and features of the invention will be apparent from the following description considered together with the accompanying drawing.

In the drawing:

FIG. 1 is a longitudinal sectional view of a typical mold comprising an embodiment of the invention.

FIG. 2 is a cross-sectional view of the same mold along the line 2—2 of FIG. 1.

FIG. 3 is a plan view of the filling tube that comprises an element of the embodiment, apart from the mold.

FIG. 4 is a fragmentary sectional view of the mold showing the filling tube in open position for loading the mold cavities.

FIG. 5 is a view similar to FIG. 4 with the filling tube in its closed position.

Referring to the drawing more particularly, the embodiment is illustrated in conjunction with a mold 11 having cavities 12 into which the filling material is to be passed, and channels 13 forming jackets through which a heat exchange fluid, such as steam, is applied to heat the mold after the cavities are filled. Suitable inlet and outlet passages 14 and 15 are provided for the heating fluid, all in accordance with conventional structure.

The invention departs from this conventional structure by providing integral with the top of the mold or at some other suitable location, a wall shaped to form a tubular bearing 16 having slot openings 17 adjacent the cavities to be filled. A tube 18 is rotatably mounted in the bearing 16 and it extends from one end of the mold to the other with the ends thereof extending beyond the mold.

The tube 18 contains slots 19 which, in one position of rotation of the tube, register with the openings 17, but which are closed by the wall of the bearing when rotated to a position beyond the opening 17.

One end of the tube 18 is provided with a swivel nipple 20 which is adapted to receive one end of an air supply hose 21. The opposite end of the tube has a swiveled section 22 adapted for connection to a pipe 23 leading from a supply hopper or reservoir (not shown) of the filling material, such as beads of polystyrene 24.

At each end of the tube 18 thrust collars 25 and 26, respectively, are removably clamped to the tube by Allen set screws 27 and 28 or by any other suitable means. The collars 25 and 26 are disposed in abutting engagement with the mold and thereby serve to hold the tube in place and prevent its longitudinal displacement relative to the mold and also serve as a grip to facilitate rotating the tube in the bearing.

In actual practice, the tube 18 is rotated to align the slot openings 17 with the slots 19. The filling beads 24, for example, are then passed into the tube from the supply station through the pipe 23. This may be effected either by gravity flow or by entrainment of the beads in a stream of air, such as, by the conventional use of a Venturi tube (not shown). The beads pass through the slots 19 of the tube 18 and into the mold cavities 12. This is continued until the cavities are filled, whereupon the filling tube 18 is rotated to close the slots. See FIG. 5. The beads remaining in the tube are then expelled by a blast of air admitted to the tube at the opposite end, from a source of moving air (not shown). The mold is then ready to be heated and further processed in a conventional manner to complete the molding procedure.

Having thus described my invention, I claim:

1. In a mold having a cavity to be filled with material to be molded from an external source of supply of such material, said mold having a wall forming a tubular passageway adjacent said cavity, said wall having an opening therethrough communicating with said cavity, a hollow tube rotatably mounted in the passageway, said tube having an opening in the wall thereof adapted to register with the wall opening in one position of rotation therein, means for communicating one end of the tube for reversible flow with a source of flowable moldable material and for connecting the opposite end to a source of air current.

2. A mold as defined by claim 1 and means for resisting longitudinal displacement of the tube relative to the mold.

3. A mold as defined by claim 1 and thrust flanges removably secured to the tube in abutting engagement with the mold for resisting longitudinal displacement of the tube relative to the mold.

4. A mold having a cavity therein for the reception of material to be molded, a hollow wall portion adjacent the cavity, a tube rotatably mounted in the hollow wall portion, said tube and wall portions having openings therein, respectively, said openings being mutually registerable in one position of rotation of the tube in the wall portion, said tube having an opening therein at one end for the inflow of material to be molded, and means for delivering a countercurrent of air through the tube at the opposite end to expel residual material retained in the tube back through said opening.

References Cited by the Examiner

UNITED STATES PATENTS

| | | | |
|---|---|---|---|
| 2,334,035 | 11/1943 | Robertson | 215—76 |
| 2,537,182 | 1/1951 | Bertrand | 18—30 |
| 2,576,804 | 11/1951 | Mornik | 222—193 |
| 2,705,342 | 4/1955 | Hendry | 18—30 |
| 3,092,440 | 6/1963 | Rex et al. | 18—55 |
| 3,092,441 | 6/1963 | Bilderbeek | 18—55 |
| 3,099,045 | 7/1963 | Honkanen | 18—38 XR |
| 3,159,875 | 12/1964 | Stutz et al. | 18—5 |

FOREIGN PATENTS

| | | |
|---|---|---|
| 623,812 | 7/1961 | Canada. |
| 1,030,060 | 3/1953 | France. |

OTHER REFERENCES

Exploring Fabrication Techniques, Plastic Technology, vol. 7, No. 4, pages 40, 41 and 43, April 1961.

WILLIAM J. STEPHENSON, *Primary Examiner.*

ALEXANDER H. BRODMERKEL, ROBERT F. WHITE, *Examiners.*